United States Patent [19]

Moffett et al.

[11] Patent Number: 5,503,820

[45] Date of Patent: *Apr. 2, 1996

[54] METHOD FOR PREPARING LOW-CONCENTRATION POLYSILICATE MICROGELS

[75] Inventors: Robert H. Moffett, Landenberg, Pa.; John D. Rushmere, Wilmington, Del.

[73] Assignee: E. I. Du Pont de Nemours and Company, Wilmington, Del.

[*] Notice: The term of this patent shall not extend beyond the expiratin date of Pat. No. 5,279,807.

[21] Appl. No.: 345,890

[22] Filed: Nov. 28, 1994

Related U.S. Application Data

[63] Continuation-in-part of Ser. No. 166,679, Dec. 16, 1993, abandoned, which is a continuation-in-part of Ser. No. 93,157, Jul. 23, 1993, Pat. No. 5,312,595, which is a division of Ser. No. 887,793, May 26, 1992, Pat. No. 5,279,807.

[51] Int. Cl.[6] .................................................. C01B 33/32
[52] U.S. Cl. .......................... 423/333; 423/335; 423/338; 501/12; 252/315.6
[58] Field of Search ..................................... 423/333, 338, 423/335; 252/315.6; 501/12

[56] References Cited

U.S. PATENT DOCUMENTS

| | | | |
|---|---|---|---|
| 2,217,466 | 10/1940 | Baylis | 210/23 |
| 2,234,285 | 3/1941 | Schworm et al. | 210/23 |
| 2,310,009 | 2/1943 | Baker et al. | 210/23 |
| 2,444,774 | 7/1948 | Hay | 210/23 |
| 2,466,842 | 4/1949 | Elston | 252/313 |
| 2,769,785 | 11/1956 | Walker | 252/359 |
| 4,213,950 | 7/1980 | Mahler | 423/329 |
| 4,554,211 | 11/1985 | Akira et al. | 428/402 |
| 4,954,220 | 9/1990 | Rushmere | 162/168.3 |
| 5,066,420 | 9/1991 | Chevallier | 252/313.2 |
| 5,176,891 | 1/1993 | Rushmere | 423/328.1 |
| 5,279,807 | 1/1994 | Moffett et al. | 423/338 |

FOREIGN PATENT DOCUMENTS

| | | |
|---|---|---|
| 584727 | 10/1959 | Canada . |
| 0359552 | 3/1990 | European Pat. Off. . |
| 0270289 | 7/1989 | Germany . |
| 827586 | 2/1960 | United Kingdom . |
| 1044019 | 9/1966 | United Kingdom . |
| 1300946 | 12/1972 | United Kingdom . |
| WO91/07350 | 5/1991 | WIPO . |

OTHER PUBLICATIONS

Reynold C. Merrill, Activated Silica Sols In Water Treatment, 40, 1355–1359, Aug. 1948.

Reynold C. Merrill, Activated Silica–A New Chemical Eng. Tool, 1947, vol. 1, No. 1, 27–32, (no month).

L. L. Klinger, Improvements In The Coagulation Of Surface Waters With Activated Silica, Apr. 1946, vol. 122, 40–50.

*Primary Examiner*—Michael Lewis
*Assistant Examiner*—Stuart L. Hendrickson
*Attorney, Agent, or Firm*—George A. Frank

[57] ABSTRACT

An improved method for preparing low-concentration polysilicate microgels from a water soluble silicate and a strong acid in which the silicate and acid are mixed at a rate to produce a Reynolds number of at least 4000, the mixture is aged and then diluted to a silica concentration of not more than 1.0 wt. %. The method achieves reduced silica deposition during the preparation of the microgels.

3 Claims, 2 Drawing Sheets

METHOD FOR PREPARING LOW-CONCENTRATION POLYSILICATE MICROGELS

RELATED U.S. APPLICATIONS

This application is a continuation-in-part of U.S. Ser. No. 08/166,679, now abandoned, filed Dec. 16, 1993, which application was a continuation-in-part of U.S. Ser. No. 08/093,157 filed Jul. 23, 1993 now U.S. Pat. No. 5,312,595, which was a divisional of U.S. Ser. No. 07/887,793 filed May 26, 1992 now U.S. Pat. No. 5,279,807.

BACKGROUND OF THE INVENTION

The present invention relates to an improved method and apparatus for preparing low-concentration polysilicate microgels, i.e., aqueous solutions having an active silica concentration of generally less than about 1.0 wt. %, which are formed by the partial gelation of an alkali metal silicate or a polysilicate, such as sodium polysilicate, having in its most common form one pan $Na_2O$ to 3.3 parts $SiO_2$ by weight. The microgels, which are referred to as "active" silica in contrast to commercial colloidal silica, comprise solutions of from 1 to 2 nm diameter linked silica particles which have a surface area of at least about 1000 $m^2/g$. The particles are linked together during preparation, i.e., during partial gelation, to form aggregates which are arranged into three-dimensional networks and chains. A critical aspect of the invention is the ability to produce the microgels within a reasonable time period, i.e., not longer than about 15 minutes until the microgel is ready for use, without the risk of solidification and with minimum formation of undesirable silica deposits within the processing equipment. Polysilicate microgels produced according to the invention are particularly useful in combinations with water soluble cationic polymers as a drainage and retention aid in papermaking. At low pH values, below pH of 5, these products are more appropriately referred to as polysilicic acid microgels. As the pH value is raised, these products can contain mixtures of polysilicic acid and polysilicate microgels; the ratio being pH-dependent. For sake of convenience, these products hereinafter will be referred to as polysilicate microgels.

The present invention is an improved method and apparatus for continuously preparing a low-concentration polysilicate microgel which comprises: (a) simultaneously introducing a first stream comprising a water soluble silicate solution and a second stream comprising a strong acid having a pKa less than 6 into a mixing zone where the streams converge at an angle of not less than 30 deg and at a rate sufficient to produce a Reynolds number of at least about 4000 and a resulting silicate/acid mixture having a silica concentration in the range of from about 1.0 to 6.0 wt. % and a pH in the range of from 2 to 10.5; (b) aging the silicate/acid mixture for a period of time sufficient to achieve a desired level of partial gelation (i.e., forming the microgel), usually for at least 10 seconds but not more than about 15 minutes; and (c) diluting the aged mixture to a silica concentration of not greater than about 1.0 wt. % whereby gelation is stabilized.

For best results, the silica concentration of the water soluble silicate starting solution is in the range of from 2 to 10 wt. % silica, and the concentration of the strong acid (e.g., sulfuric acid) is in the range of from 1 to 20 wt. % acid as the two streams are being introduced into the mixing zone. The preferred conditions in the mixing zone are a Reynolds number greater than 6000, a silica concentration in the range of 1.5 to 3.5 wt. % and a pH in the range of 7 to 10. The most preferred conditions are a Reynolds number greater than 6000, silica concentration of 2 wt. % and a pH of 9.

The apparatus according to the invention comprises: (a) a first reservoir for containing a water soluble silicate solution; b) a second reservoir for containing a strong acid having a pKa of less than 6; (c) a mixing device having a first inlet which communicates with said first reservoir, a second inlet arranged at an angle of at least 30 deg with respect to said first inlet which communicates with said second reservoir, and an exit; (d) a first pumping means located between said first reservoir and said mixing device for pumping a stream of silicate solution from said first reservoir into said first inlet, and first control means for controlling the concentration of silica in said silicate solution while said solution is being pumped such that the silica concentration in the exit solution from the mixing device is in the range of 1 to 6 wt. %; (e) a second pumping means located between said second reservoir and said mixing device for pumping a stream of acid from said second reservoir into said second inlet at a rate relative to the rate of said first pumping means sufficient to produce a Reynolds number within said mixing device of at least 4000 in the region where the streams converge whereby said silicate and said acid are thoroughly mixed; (f) mixture control means located within said exit and responsive to the flow rate of said acid into said mixing device for controlling the pH of the silicate/acid mixture in the range of from 2 to 10.5; (g) a receiving tank; (h) an elongated transfer loop which communicates with the exit of said mixing device and said receiving tank for transferring said mixture therebetween; and (i) a dilution means for diluting the silicate/acid mixture in the receiving tank to a silica concentration of not more than 1.0 wt. %.

In an alternate embodiment, the apparatus of the invention includes a NaOH reservoir and means for periodically flushing the production system with warm NaOH which has been heated to a temperature of from 40° to 60° C. whereby deposits of silica can be solubilized and removed.

In a further embodiment of the invention, an agitating gas stream such as a stream of air or nitrogen or other inert gas can be introduced into the mixing device described by means of an additional inlet located at or near the mixing junction. Gas agitation provides an important industrial benefit in that it permits low silicate flow rates to be employed while maintaining the required turbulence and Reynolds number in the mixing zone.

In yet a further embodiment of this invention, mixing of the acid and the water soluble silicate solution can be accomplished in an annular mixing device. This device can be an internal pipe or tube which protrudes into and subsequently discharges inside of a larger pipe or tube. The internal pipe discharge point is usually, but not necessarily, concentrically located inside the external pipe. One of the two fluids to be mixed is fed into the internal pipe. The second fluid is fed into the external pipe and flows around the outside of the internal pipe. Mixing of the two fluids occurs where the first fluid exits the internal pipe and combines with the second fluid in the larger external pipe.

For the purpose of mixing the two liquids, the water soluble silicate solution and the acid can be fed to either the internal or the external pipes at rates sufficient such that when the two streams are combined, a Reynolds number of greater than 4000 is produced in the mixing zone. An agitating gas stream can also be optionally employed to aid in the mixing of the two streams.

As a further embodiment to this invention, mixing of the acid and water soluble silicate solution can be accomplished in a vessel equipped with mechanical means to create the necessary turbulence, such that mixing of the two streams is accomplished at a Reynolds number of greater than 4000. The vessel can optionally be equipped with baffles. The acid and water soluble silicate solution can be but do not have to be fed to the vessel simultaneously.

The method and apparatus of the invention are capable of producing stable polysilicate microgels resulting in reduced silica deposition within a convenient time frame of not more than about 15–16 minutes, but usually within 30 to 90 seconds, without the risk of solidification and with minimum formation of undesirable silica deposits within the processing equipment. Temperature of operation is usually within the range of 0°–50° C.

Silica deposition in production apparatus is undesirable because it coats all internal surfaces of the apparatus and can impede the functioning of vital moving parts and instrumentation. For example, silica deposition can build to the point where valves can no longer function and can restrict fluid flow through pipes and tubing. Deposition of silica is also undesirable on the pH sensing electrode as it prevents monitoring the process pH, a critical quality control parameter for silica microgel production.

DETAILED DESCRIPTION OF THE INVENTION

Figure 1:
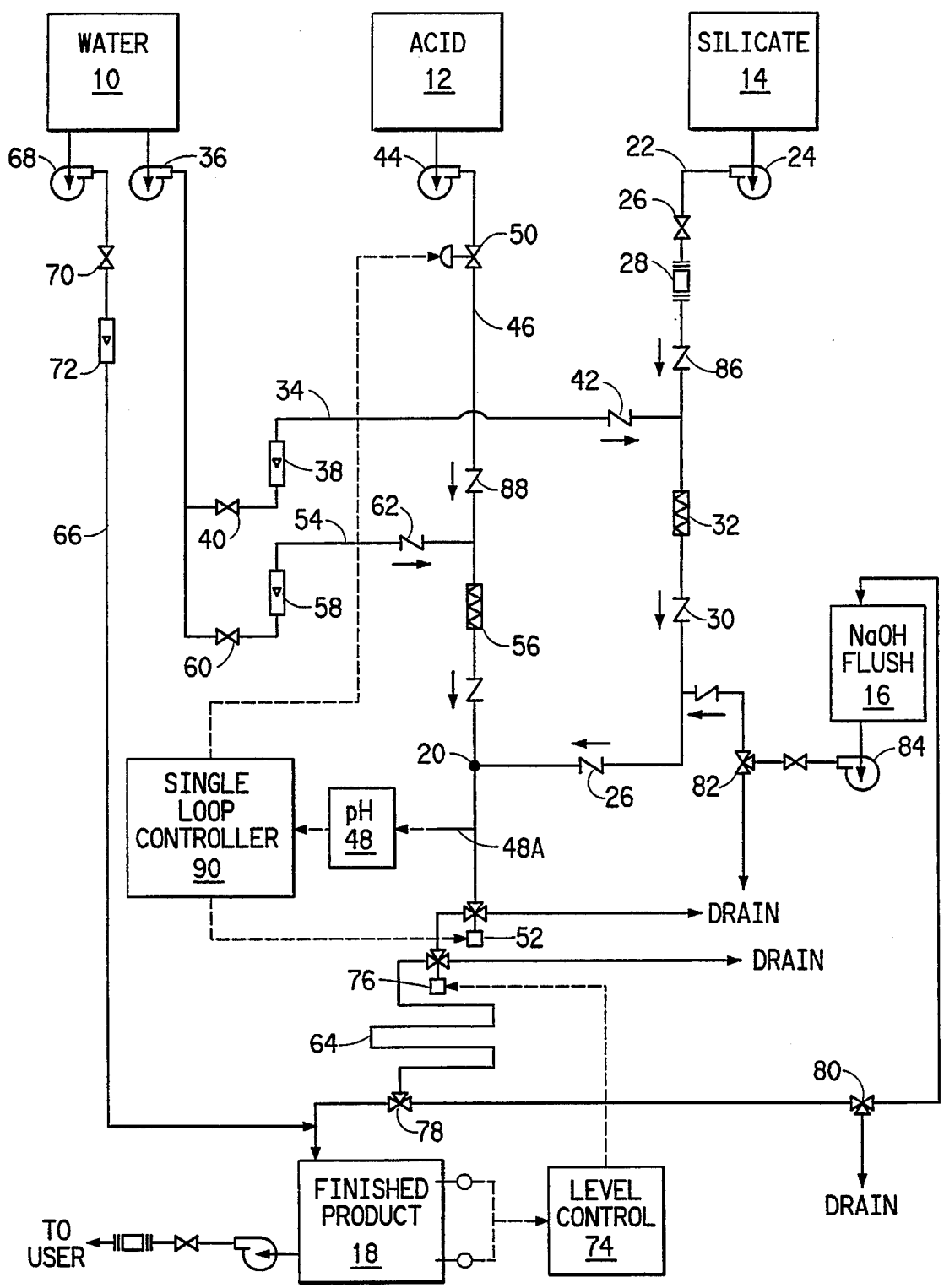
FIG. 1 is a schematic diagram of the process of the invention which includes a NaOH reservoir and means for periodically flushing the production system.

Active silica is a specific form of microparticulate silica comprising very small 1–2 nm diameter particles which are linked together in chains or networks to form three-dimensional structures known as "microgels". The surface area of the active silica microparticulates, i.e., the microgels, is at least about 1000 m$^2$/g. General methods for preparing polysilicate microgels are described in U.S. Pat. No. 4,954,220, the teachings of which are incorporated herein by reference. Of the methods described therein, the acidification of a dilute aqueous solution of an alkali metal silicate with an inorganic acid or organic acid, i.e., a strong acid having a pKa of less than 6, is the method to which this invention is particularly applicable. The present invention provides for the reliable and continuous preparation of low-concentration polysilicate microgels at the site of intended consumption without formation of undesirable silica deposits within the processing equipment and at very reasonable aging times generally less than 15 minutes, and preferably between from 10 to 90 seconds.

The method of the invention is carried out by simultaneously introducing a stream of a water soluble silicate solution and a stream of strong acid having a pKa less than 6 into a mixing zone or mixing junction such that the streams converge at an angle of generally not less than 30 deg. with respect to each other and at a rate which is sufficient to produce a Reynolds number in the region where the two streams converge of at least 4000, and preferably in the range of about 6000 and above. Reynolds number is a dimensionless number used in engineering to describe liquid flow conditions within a tube or pipe. Numbers below 2000 represent laminar flow (poor mixing environment) and numbers of 4000 and above represent turbulent flow (good mixing environment). As a general rule, the larger the Reynolds number the better the mixing. Reynolds number, (Re) for flow in a pipe or tube, is determined from the equation $$Re = \frac{Q \times d}{D \times u}$$

Where:
Q=Flow in cubic feet per second
d=Density in pounds per cubic foot
D=Pipe diameter in feet
u=Viscosity in pounds per foot second Reynolds number for impeller-stirred vessels is determined from the equation $$Re = (D^2 \times N \times p)/u$$

Where:
D=Impeller diameter in cm
N=Rotational velocity in revolutions per second
p=Fluid density in grams per cm$^3$
u=Viscosity in grams per (second)(centimeter)

The concentrations of the converging silicate solution and the acid streams are controlled so that the resulting silicate/acid mixture thus produced has a silica concentration in the range of 1 to 6 wt. % and a pH in the range of 2 to 10.5. More preferably the silica concentration is in the range of 1.5 to 3.5 wt. % and the pH is in the range of 7 to 10. The most preferred operating conditions are with a Reynolds number larger than 6000, a silica concentration of 2 wt. % and a pH of 9.

Aging is generally accomplished in from 10 up to about 90 seconds by passing the silicate/acid mixture through an elongated transfer loop in route to a finished product receiving tank in which the mixture is immediately diluted and thereafter maintained at an active silica concentration of not greater than 1.0 wt. %. Partial gelation which produces the three-dimensional aggregate networks and chains of high surface area active silica particles is achieved during aging. Dilution of the silicate/acid mixture to low concentration operates to halt the gelation process and stabilize the microgel for subsequent consumption.

The method of the invention and an apparatus for carrying it out will now be discussed in greater detail in reference to the drawings in which FIG. 1 is a schematic diagram of the process in its simplest form. The sizes, capacities and rates described herein can be varied over wide ranges depending primarily on the quantities of polysilicate microgel required and the expected rate of consumption. The sizes and capacities described in reference to the drawings relate to a system for producing, i.e., generating, polysilicate microgel on a generally continuous basis for consumption as a drainage and retention aid in a papermaking process in which the consumption rate ranges from about 10 to 4000 lbs. microgel per hour.

There is shown in FIG. 1 a dilution water reservoir 10, an acid reservoir 12, and a silicate reservoir 14. The reservoirs, i.e., tanks, are conveniently made of polyethylene, with the water reservoir having a capacity of 500 gallons, the acid reservoir having a capacity of 100 gallons, and the silicate reservoir having a capacity of 300 gallons. Other vessels shown in FIG. 1 are NaOH flush tank 16 and finished product receiving tank 18. The NaOH flush tank is made of a non-corrosive material, such as, for example, 316 stainless steel; it has a capacity of 20 gallons and is heated with an electrical resistance drum heater wrapped around it (Cole-Palmer, 2000 watts, 115 volts). The finished product receiving tank has a capacity of 1000 gallons and is made of polyethylene.

A critical element of the process is mixing junction 20 which defines a mixing zone in which a stream of acid and a stream of water soluble silicate are introduced along individual paths which converge within the mixing zone at an angle generally not less than 30 deg. A mixing "T" or "Y" junction is suitable for practicing the invention and may readily be constructed from an appropriately sized 316 stainless steel "Swagelok" compression coupling fitted with stainless steel tubing. A "T" junction is generally preferred.

The rates at which the two streams enter, i.e. are pumped into, the mixing zone are selected to produce a Reynolds number therewithin of at least 4000 and preferably up to 6000 or higher which results in practically instantaneous and thorough mixing of the acid and silicate such that the resulting mixture has a silica concentration in the range of from 1.5 to 3.5 wt. % and a pH of from 7 to 10. Any convenient commercial source of water soluble silicate can be employed, such as, for example, "PQ (N)" sodium silicate (41 Baume, $SiO_2:Na_2O=3.22:1$ by weight, 28.7 wt. % $SiO_2$) marketed by the PQ corporation. The commercial silicate is maintained undiluted in reservoir 14, usually at a concentration of 24 to 36 wt. % as supplied by the manufacturer, until it is needed. It is supplied to the mixing junction 20 via suitable tubing 22 (316 SS, ¼ inch OD) by means of a low flow rate gear or micropump 24 (e.g., Micropump Corp., model 140, max. flow 1.7 gpm). Non-corrosive materials of construction, e.g., 316 stainless steel, are preferred to avoid any risk of corrosion and subsequent contamination. The silicate supply line also includes flow control valve 26 (Whitey, 316 SS, ¼ inch needle), magnetic flow meter 28 (Fisher Porter, 316 SS, ¹⁄₁₀ inch size) and check valve 86 (Whitey, 316 SS, ¼ inch diameter) for controlling and monitoring the amount and direction of silicate flow. In operation, dilution water is introduced into the silicate supply line 22 at a convenient location upstream of the silicate/acid mixing junction 20 so as to adjust the silica concentration to a value in the range of from 2 to 10 wt. %. To insure complete mixing of silicate and water an in-line static mixer 32 (Cole-Palmer, 316 SS, ½ inch tubing, 15 elements) is provided followed by a check valve 30 (Whitey, 316 SS, ½ inch diameter). The dilution water is supplied via line 34 (½ inch OD, 316 SS) by centrifugal pump 36 (Eastern Pump, 1 HP, max. flow 54 gpm), and a rotameter 38 (Brooks, Brass Ball, 3.06 gpm max.). Control valve 40 (Whitey, 316 SS, ½ inch NE needle) and check valve 42 (Whitey, 316 SS, ½ inch diameter) can be employed to the control flow rate and direction.

Although a wide range of acidic materials, such as, for example, mineral acids, organic acids, acid salts and gases, ion-exchange resins and the salts of strong acids with weak bases, have been described for use in preparing active silica, the simplest and most convenient means of acidification is with a strong acid having a pKa less than 6. The preferred acid is sulfuric acid. Commercial grades manufactured by Du Pont and others are generally suitable. In operation, a stock solution of acid is maintained at a concentration in the range of from 5 to 100 wt. % in acid reservoir 12. The acid is pumped using a gear or similar micropump 44 (e.g., Micropump model 040, ¼ HP, max. flow 0.83 gpm) to junction mixer 20 through line 46 (316 SS, ¼ inch OD) and check valve 88 (Whitey, 316 SS, ¼ inch diameter). A single loop controller 90 (Moore, Model 352E) is combined with pH transmitter 48 (Great Lakes Instruments, Model 672P3FICON) and pH Probe 48A (Great Lakes Instruments, Type 6028PO) to regulate the flow of acid to junction mixer 20 via automatic flow control valve 50 (Research Controls, K Trim, ¼ inch OD, 316 SS) in response to the pH of the silicate/acid mixture measured at the exit of the junction mixer. An automatic three-way valve 52 (Whitey, 316 SS, ½ inch diameter) is also employed within the control system to allow for the possibility of having to divert off-spec silicate/acid mixture to the sewer. Dilution water from water reservoir 10 is provided via line 54 (316 SS, ½ inch OD) to dilute the acid supply upstream of junction mixer 20 to a predetermined concentration in the range of from 1 to 20 wt. %. A static mixer 56 (Cole-Palmer, 316 SS, ½ inch diameter, 15 turns) is provided downstream of the point where dilution water is introduced into the acid supply line to insure complete mixing and dilution of the acid. A rotameter 58 (Brooks, Brass Ball, 1.09 gpm. maximum), control valve 60 (Whitey, 316 SS, ½ inch needle) and check valve 62 (Whitey, 316 SS, ½ inch diameter) are used to control flow rate and flow direction of the dilution water.

The silicate/acid mixture which exits junction mixer 20 has preferably a $SiO_2$ concentration in the range of from 1.5 to 3.5 wt. % and a pH in the range of from 7 to 10. Most preferably the silica concentration is maintained at 2 wt. % and the pH at 9. The mixture is passed through an elongated transfer line 64 (1½ inch schedule 40 PVC pipe, 75 feet in length) in route to finished product receiving tank 18. The length of the transfer line is selected to insure that the transfer will take at least 10 seconds, but preferably from about 30 seconds to 90 seconds, during which time "aging" or partial gelation of the mixture takes place. Transfer time can be as long as 15–16 minutes at very low flow rates and still produce satisfactory results. Dilution water from reservoir 10 is added via line 66 (316 SS, ½ inch od) to the mixture just prior to its entry into finished product receiving tank 18 or at any other convenient location so long as the silicate/acid mixture is diluted to an $SiO_2$ concentration of less than 1.0 wt. % which stabilizes the gelation process. Dilution water is supplied with centrifugal pump 68 (Eastern, 316 SS, 1 HP, 54 gpm maximum), and flow control is accomplished at a predetermined rate with control valve 70 (Whitey, 316 SS, ½ inch needle) and rotameter 72 (Brooks, SS Ball, 12.46 gpm maximum). The finished product receiving tank 18 is provided with a level control system 74 (Sensall, Model 502) which operates in conjunction with an automatic three-way valve 76 (Whitey, 316 SS, ½ inch diameter) to divert flow of the silicate/acid mixture to the sewer if the level of finished product becomes too high.

After a period of continuous operation, which depends on the amount of active silica produced, it may be desirable to cease generation of the active silica and flush the mixing junction 20 and that portion of the system which is downstream, i.e., piping, valves, transfer lines, etc., which have been in contact with the silicate/acid mixture, with water and warm NaOH. Flushing the system removes any undesirable silica deposits which may have accumulated in parts of the apparatus where the required turbulent flow conditions could not have been maintained due to design restrictions, as for example in the region of pH measurement. The flushing procedure helps maintain the system free of silica deposition and is begun by first shutting off dilution pump 68, acid pump 44 and silicate pump 24. Dilution water from pump 36 is then circulated through the downstream portion of the system for about 5 minutes, after which pump 36 is shut off, and the dilution water reservoir is isolated by closing valves 40, 60 and 70. Three-way automatic valves 52 and 76, and manufal valves 78, 80 and 82 (all Whitey, 316 SS, ½ inch OD) are then activated along with centrifugal circulating pump 84 (Eastern, 316 SS, 1.5 HP, 15 gpm maximum) to allow NaOH, maintained at a concentration of 20 wt. % and a temperature in the range of from 40° to 60° C., to circulate through the downstream portion of the system for generally not longer than about 20–30 minutes. The NaOH circulating pump 84 and the flush tank 16 are then isolated from the system by again activating three-way valves 80 and 82, and dilution water is again flushed through the downstream system and released to the sewer. Having completed the cleaning/flushing procedure, the production of active silica can be resumed.

Figure 2:
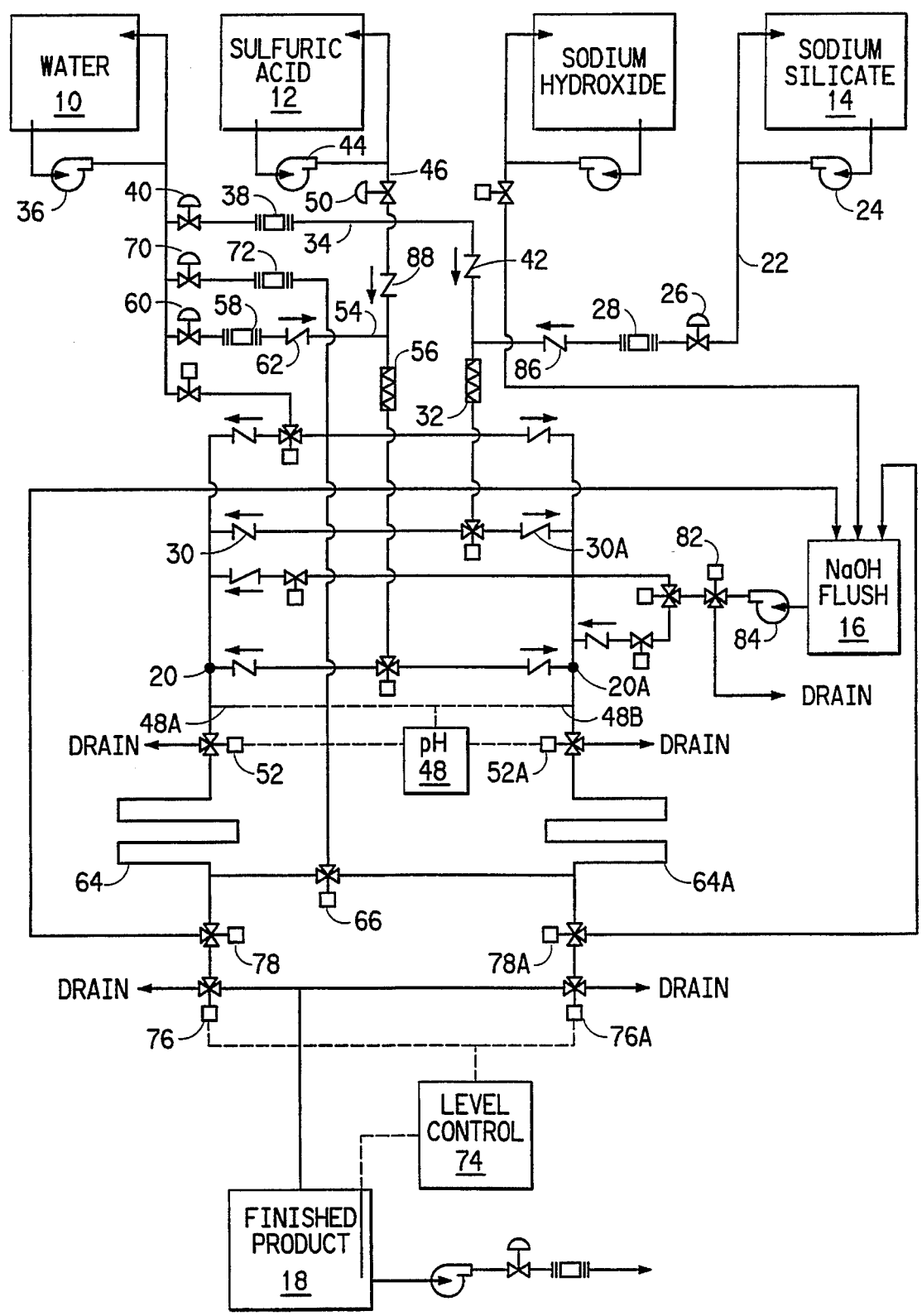
FIG. 2 is a schematic diagram of a dual line polysilicate microgel production system which provides for uninterrupted microgel production.

Referring now to FIG. 2, there is shown a schematic diagram of a dual line production system for active silica, whereby one line can be operational at all times while the other line is being flushed or being maintained in a stand-by condition. The component parts are numbered in accordance with FIG. 1. A commercial system according to either of FIGS. 1 or 2, will generally be constructed of stainless steel or polyvinyl chloride tubing of generally one inch diameter or less, depending on the requirement for active silica. When stainless steel tubing is used, connections of the various instruments, fittings, valves, and sections can be conveniently made with "Swagelok" compression joints.

EXAMPLE 1

Demonstrating the effect of turbulence in reducing silica deposition.

A laboratory generator for producing polysilicate microgels was constructed according to the principles described in FIG. 1. The silicate and sulfuric acid feeds, before dilution and mixing, contained 15 wt. % silica and 20 wt. % acid respectively. The critical junction mixer was constructed from a ¼ inch, 316 stainless steel "Swagelok" T-compression fitting fitted with 6 inch arms of ¼ inch od 316 SS tubing. The internal diameter of the fitting was 0.409 cm. For the tests in which a gas was introduced into the mixing junction a similar "Swagelok" X-compression coupling was used with the fourth arm of the X as the gas inlet. An in-line filter comprised of 1 inch diameter 60 mesh stainless steel screen was placed about 12 inches from the acid/silicate junction to trap particulate silica. The screen was weighed at the beginning of each test and again at the end of each test, after washing and drying, so as to give a measure of silica deposition. All tests were run so as to maintain conditions of 2 wt. % silica and pH 9 at the point of silicate acidification and each test was run for sufficient time to produce a total amount of 1,590 gms. of polysilicate microgel. The results of the tests are given in Table 1 below. Liquid flow represents the total liquid flow, that is, the flow of the combined silicate/acid mixture in the exit tube. In the tests where a gas was introduced to enhance liquid flow and turbulence, the Reynolds number was calculated on the basis of the increased flow rate of the liquid portion alone, assuming that liquid density and viscosity did not change appreciably. This method of calculation was adopted because there is no ready formula for calculating the Reynolds number of liquid/gas mixtures.

TABLE 1

Silica Deposition As A Function Of Reynolds Number

| Test No. | Reynolds No. | Run Time mins. | Liquid Flow ml/m | Gas Flow ml/m | Silica deposited, gms. |
|---|---|---|---|---|---|
| 1 | 1,036 | 330 | 250 | none | 0.339 |
| 2 | 2,072 | 165 | 499 | none | 0.135 |
| 3 | 4,144 | 83 | 999 | none | 0.009 |
| 4 | 6,217 | 55 | 1,498 | none | 0.007 |
| 5 | 10,362 | 33 | 2,497 | none | 0.002 |
| 6 | 12,433 | 27 | 2,996 | none | 0.008 |
| 7 | 12,260 | 120 | 694 | Air, 2,260 | 0.008 |
| 8 | 9,064 | 120 | 694 | Air, 1,490 | 0.005 |
| 9 | 5,375 | 120 | 694 | Air, 601 | 0.004 |
| 10 | 5,375 | 120 | 694 | N2, 601 | 0.014 |

A comparison of the results of Tests 1 & 2 with the results of Tests 3–10 clearly demonstrate the beneficial effect of turbulent liquid flow (Reynolds number above 4,000) in reducing the amount of silica deposition observed. Under turbulent flow conditions of the present invention, the average silica deposition of 0.007 g represented only 0.0004% of the total amount of silica processed. When the Reynolds number was below the minimum of 4,000 required by the instant invention, undesirable silica deposition was at least approximately 15-fold increased. Once the minimum Reynolds number required by the process of this invention was reached, increasing the Reynolds number above 4,000, for exampe from 4,144 to 6,217 to 10,362, etc. did not appreciably reduce silica deposition further.

EXAMPLE 2

Apparatus

A commercial sized apparatus for preparing active silica microgels was assembled according to the schematic design shown in FIG. 1 and installed in a commercial paper mill. The apparatus, except for the raw material supply reservoirs, was rigidly mounted on steel framework on two skids each measuring approximately six feet by eight feet. On skid 1 was mounted inlets for connection to commercial supplies of sodium silicate and sulfuric acid and an inlet for city water which was used for dilution purposes. Also on skid 1 was mounted the dilution and flow control means, the silicate/acid mixing junction, pH measurement and pH controller, sodium hydroxide flush reservoir, required pumps and valves and the electrical controls. On skid 2 was mounted the aging loop, finished product reservoir, level controller and required pumps and valves. Overall height of each skid was about seven feet. The manufacturers supply containers were used as reservoirs for the silicate and sulfuric acid and these were connected directly to the appropriate inlets on skid 1.

The apparatus was operated continuously for six (6) days during which 0.5 wt. % active silica was produced at a rate which varied between 3 and 4.8 gallons per minute. At a production rate of 3 gpm, a Reynolds number of 4250 was calculated for the mixing zone employed. No silica deposition was observed within the junction mixer 20, although some silica deposition was observed in the proximity of the pH probe located immediately downstream from the junction mixer exit after 12 hours of continuous operation. To alleviate this situation, a water/NaOH/water flush sequence was conducted, which took less than 30 minutes, and the system was then returned to normal production. Over the entire six day period, the apparatus operated without fault and produced active silica of excellent quality which was utilized by the mill for the production of a range of papers with different basis weights.

We claim:

1. An improved method for continuously preparing a polysilicate microgel resulting in reduced silica deposition in which the microgel comprises a solution of primary silica particles from 1 to 2 nm diameter silica particles having a surface area of at least about 1000 m$^2$/g which are linked together into individual chains to form three-dimensional network structures and comprises:

(a) simultaneously introducing a first stream comprising a water soluble silicate solution and a second stream comprising a strong acid having a pKa less than 6 into an annular mixing device where the streams converge by the discharge of one stream from an internal pipe of the mixing device into the second stream flowing through an external pipe at a rate sufficient to produce a Reynolds number in the mixing zone of the mixing device of at least about 4000 and a resulting silicate/acid mixture having a silica concentration in the range of from 1 to 6 wt. % and a pH in the range of from 2 to 10.5;

(b) aging the silicate/acid mixture for a period of time sufficient for the primary silica particles to link together and form said three-dimensional structures while remaining in solution, but not longer than 15 minutes; and (c) diluting the aged mixture to a silica concentration of not greater than 1.0 wt. %.

2. The method of claim 1 wherein the silica concentration in the resulting silicate/acid mixture is from 1.5 to 3.5 wt. % and the pH is from 7 to 10.

3. The method of claim 1 wherein the pH is from 2 to 7.

* * * * *